United States Patent

[11] 3,612,645

| [72] | Inventors | T. O. Paine<br>Administrator of the National Aeronautics and Space Administration with respect to an invention of;<br>Gary L. Parker, La Cananda, Calif.;<br>Frederick R. Chamberlain, La Cananda, Calif. |
|---|---|---|
| [21] | Appl. No. | 856,328 |
| [22] | Filed | Sept. 9, 1969 |
| [45] | Patented | Oct. 12, 1971 |

[54] OPTICAL BINOCULAR SCANNING APPARATUS
13 Claims, 5 Drawing Figs.

[52] U.S. Cl. .................................................. 350/23,
350/19, 350/26, 350/35, 350/36, 350/49, 350/52
[51] Int. Cl. ........................................................ G02b 23/02
[50] Field of Search .......................................... 350/19,
21–24, 26, 36, 49, 52, 35; 956/15

[56] References Cited
UNITED STATES PATENTS
2,966,096  12/1960  D'Incenti et al. ............. 350/23 X
3,401,233  9/1968  Hellings ......................... 350/23 X

*Primary Examiner*—David Schonberg
*Assistant Examiner*—Toby H. Kusmer
*Attorneys*—J. H. Warden, Monte F. Mott and G. T. McCoy ABSTRACT: An optical scanner is disclosed comprising a linear housing having an optical instrument such as a camera rotatably mounted therein. A first mirror is fixedly mounted in the housing at the optical end of the image sensor at a 45° angle to the image plane thereof. An L-shaped housing is provided having one end rotatably mounted on the linear housing with the one end being in optical communication with the optical instrument by reflection from the first mirror. A second mirror is mounted at the corner of the L-shaped housing for redirecting the optical path out through the other end thereof. During any rotation of the L-shaped housing, the optical instrument is counterrotated to compensate for the image rotation on the first mirror so that, for example on a television monitor, the picture transmitted by the optical instrument would be always upright.

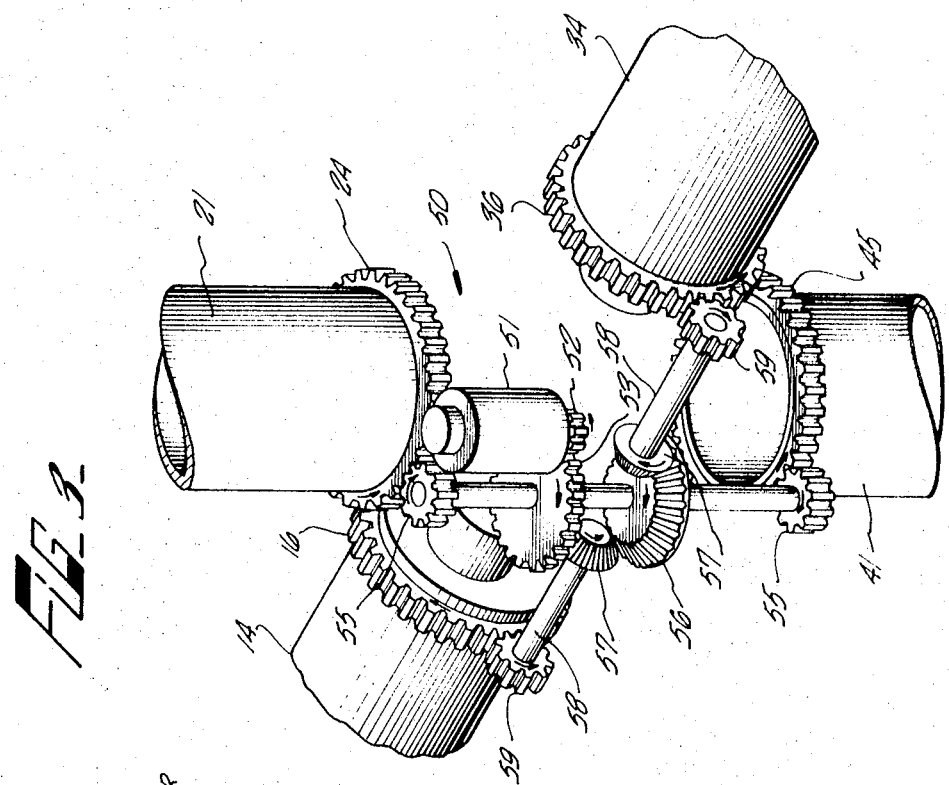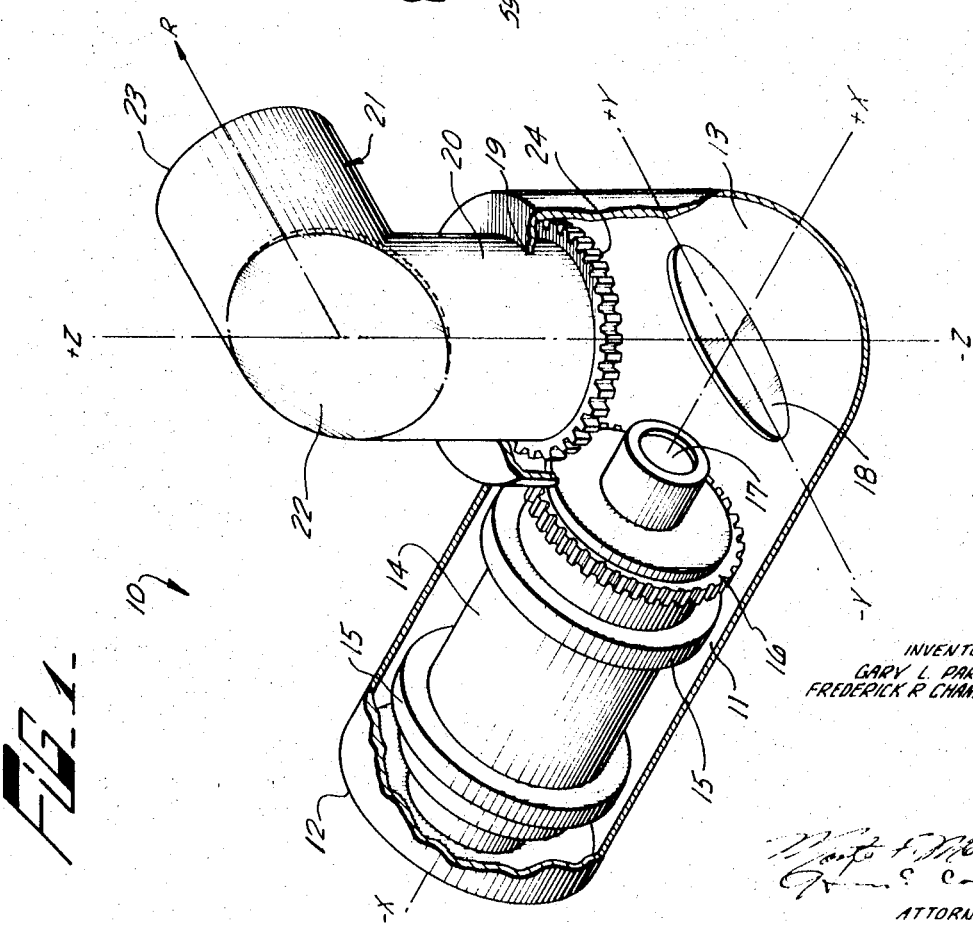

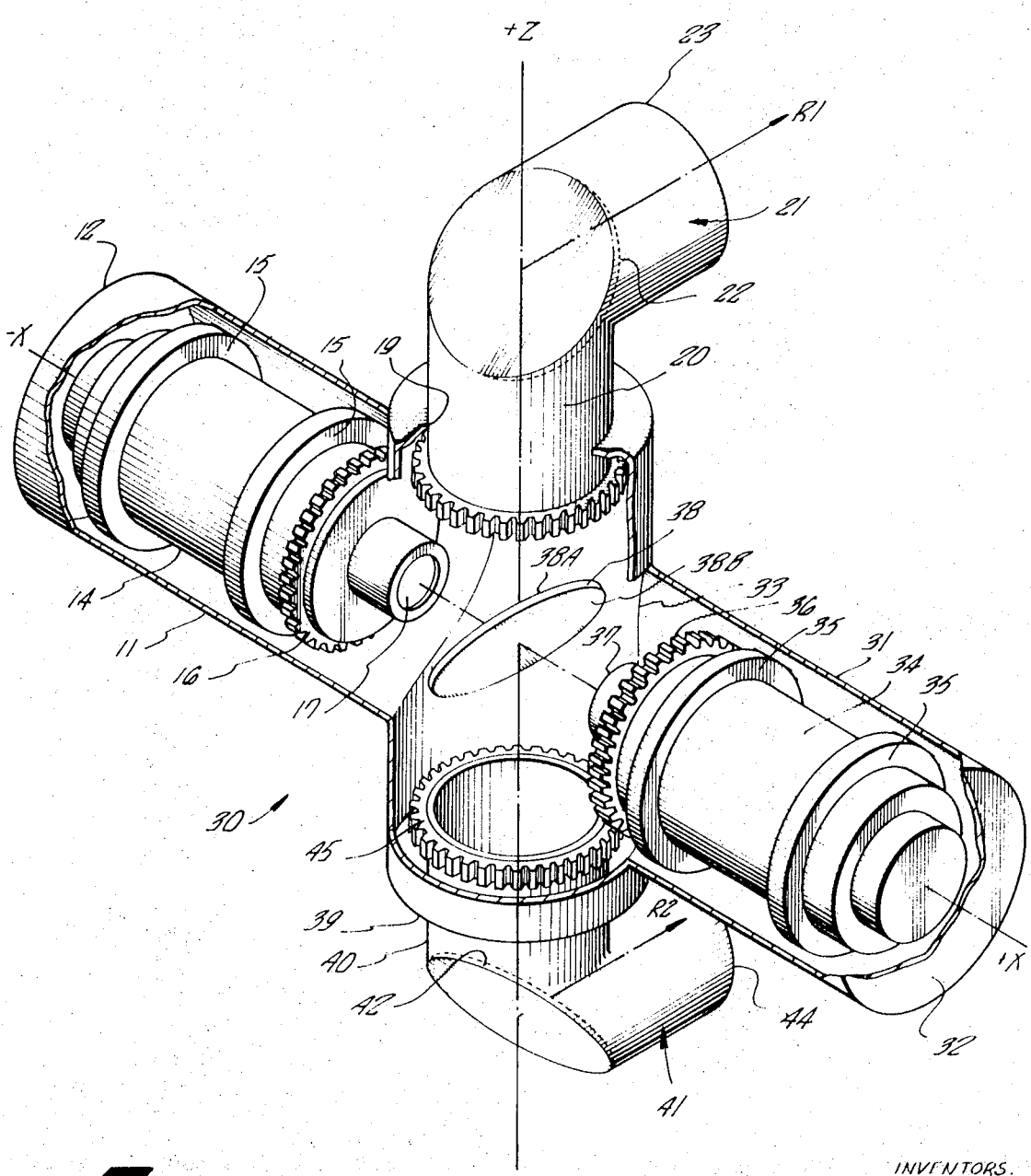

INVENTORS.
GARY L. PARKER
FREDERICK R. CHAMBERLAIN

ATTORNEYS.

INVENTORS.
GARY L. PARKER
FREDERICK R. CHAMBERLAIN

ATTORNEYS.

OPTICAL BINOCULAR SCANNING APPARATUS

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to optical sighting or projection devices and more particularly to binocular scanning instruments intended to be universally applicable to scanning and stereoscopic viewing.

2. Description of the Prior Art

Heretofore, optical scanning apparatus of the type here under consideration have employed a viewing eyepiece in fixed relation to the operator and an optomechanical system of reflecting mirrors carried by a plurality of gimbals, the latter also supporting a telescope objective. This permits both elevation and azimuth scanning. Such an arrangement is commonly known as a two axis panoramic periscope-type optical apparatus. The panoramic characteristic of such a sight is needed in many applications to inspect relatively wide areas, both vertically and horizontally.

It is well known in the optical field that such systems introduce image-rotation at the eyepiece which is proportional to the algebraic sum of the gimbal angles as the image is channeled through the system and delivered to the eyepiece. In order, therefore, that the operator view an accurate image of the scanned scene it is necessary that an image-derotation device be introduced into the optomechanical system.

There have been many arrangements heretofore used to accomplish such image-derotation. It is common practice to compensate for the image rotation by means of a reflecting element interposed in the path of light. Typical examples of such devices utilize various types inverting prisms, such as the Dove prism, the Pechan prism, the Delta prism, the Porro prism, and the Amici prism. Another arrangement, known to the art as the "K" mirror, has found general acceptance in accomplishing derotation.

Although such devices have been used successfully, several problems are encountered which severely limit their utilization. The most serious problem is that all of the added corrective elements and the gimbal structure add a large amount of complexity of the device, which tends to introduce mechanical and optical errors that severely limit their accuracy.

OBJECTS AND SUMMARY OF THE INVENTION

This invention obviates the above-mentioned shortcomings by providing an optical scanning apparatus that will deliver an accurately derotated image while avoiding introduction of mechanical errors. One embodiment of the invention comprises a linear housing having an image sensor, such as a camera or vidicon, rotatably mounted therein. A first mirror is fixedly mounted in the housing at the optical end of the image sensor at a 45° angle to the image plane thereof. An L-shaped housing open at both ends, has one end rotatably oriented perpendicular to the axis of the linear housing and is in optical communication with the image sensor by reflection from the first mirror through the one open end. A second mirror is mounted in the L-shaped housing at the corner thereof, at a fixed angle with the perpendicular for redirecting the optical path out through the remaining open end, whereby the L-shaped housing, when rotated, will scan through 360° incurring a rotating image on the first mirror with the image sensor rotating in the opposite direction to compensate for the image rotation. As a result, the image received by the L-shaped housing, both in azimuth and in elevation, is accurately transmitted to the image sensor and the counter rotation of the image sensor compensates for the image rotation of the first mirror. Therefore, the picture transmitted to the television monitor by the image sensor is always upright.

Other embodiments are described utilizing the inventive concept wherein two of the systems described in the first embodiment are combined to provide binocular instruments.

An important advantage of such an apparatus is that it provides versatile platform gimballing without a rotating table and a set of trunnions.

Another embodiment of the invention provides a binocular combination comprising an additional set of elements numerated above in coaxial juxtaposition with the first set, having the first mirror common to both sets.

Another advantage of the apparatus of the present invention is that the need for corrective prisms interposed within the apparatus is eliminated. Furthermore, the use of such gimbals requires high-powered inertia moving servosystems and the allocation of space for far larger mechanical envelopes in systems design.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the scanning apparatus with the housing broken away to show the interior components therein;

FIG. 2 is a perspective view of another embodiment of the present invention illustrating a binocular combination;

FIG. 3 is a perspective view of the drive mechanism for rotating the various components of the apparatus;

DESCRIPTION OF THE PREFERRED EMBODIMENT

Figure 4:
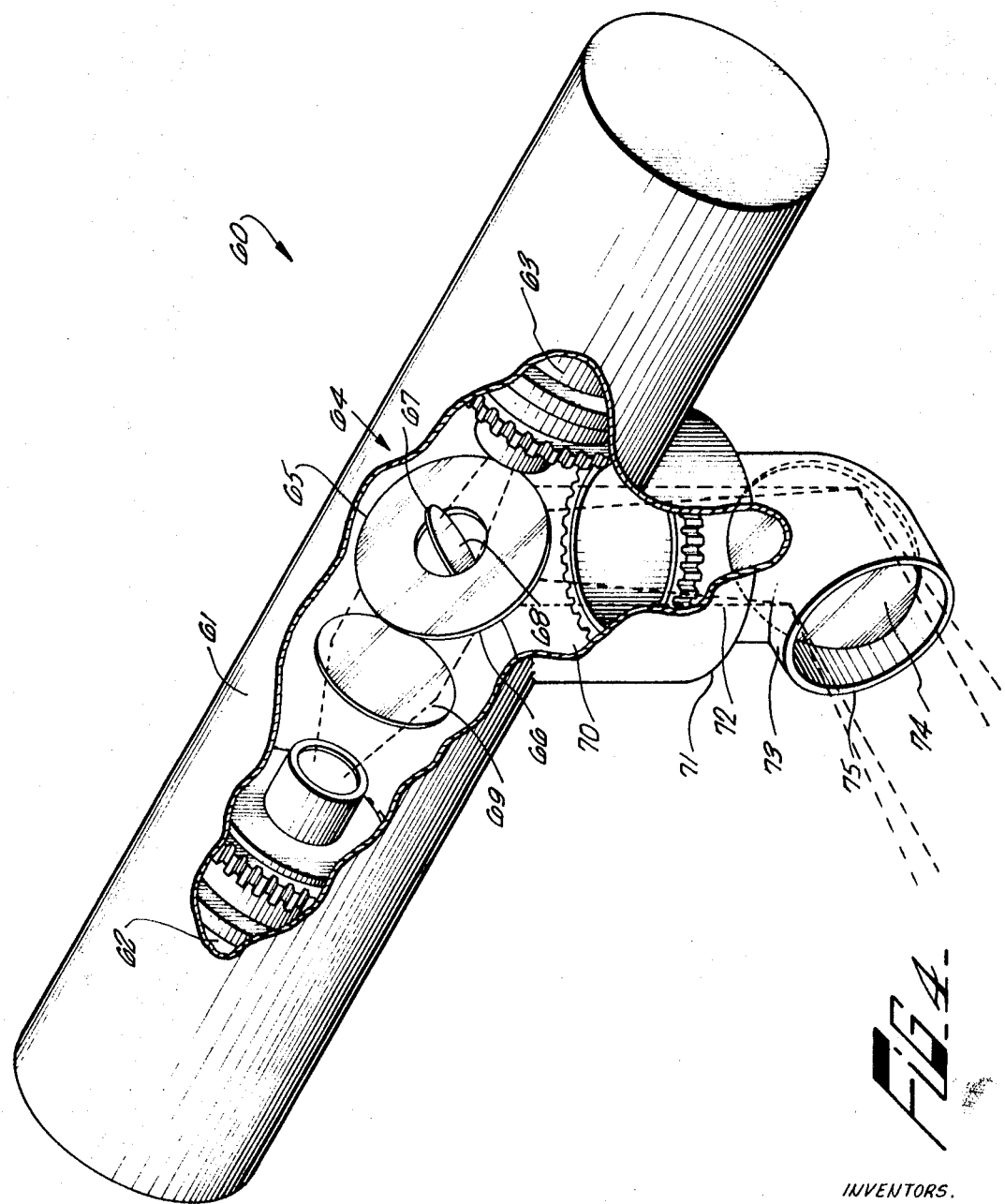
FIG. 4 is a perspective view of another embodiment of the present invention.

Referring now to the drawings, FIG. 1 shows an optical scanning apparatus, generally indicated by arrow 10, comprising a linear housing 11 having a closed end 12 and an angled end 13. An optical instrument such as a camera 14 is rotatably mounted within the housing 11 by means of a pair of annular bearing supports 15. For descriptive purposes, the camera 14 is described as rotating about an axis X and includes a gear 16 fixedly attached thereto for connection to the drive means (not shown) which will be described in greater detail hereinafter. A lens 17 is located at the optical end of the camera 12 facing the angled end 13 and is positioned to be centered on the optical axis X. A mirror 18 is fixedly mounted within the angled end 13 at a 45° angle to the image plane of the camera 14. The angled end 13 of the housing 11 also includes an aperture 19 formed therein for receiving the lower end 20 of an L-shaped housing 21, which is oriented about an axis Z, which is perpendicular to the X axis. The L-shaped housing 21 is also in optical communication with the camera 14 by reflection from the mirror 18 through the open end 20. A second mirror 22 is mounted in the L-shaped housing 21 at the corner thereof at a fixed angle (preferably 45°) with the perpendicular for redirecting the optical path out through the other open end 23. For illustrative purposes the optical path through the open end 23 is also on an optical axis R which is illustrated as being parallel to an axis Y and perpendicular to the X and Z axis.

The lower end 20 also includes an annular gear 24 fixedly attached thereto to be rotatably driven by drive means (not shown) which will be described hereinafter.

FIG. 2 shows a binocular combination, generally indicated by arrow 30, including the components previously described in FIG. 1 and further comprising an additional set of elements in coaxial juxtaposition with the first set. In this embodiment of the invention the linear housing 11 further includes a linear extension 31 located on the X axis and having a closed end 32 and a downwardly angled end 33 extending parallel but in opposite direction to the angled end 13 and cooperating to form a cross-shaped housing. A second camera 34 is rotatably mounted within the linear extension 31 by means of a pair of annular bearing supports 35. The internal end of the camera 34 includes an annular gear 36 fixedly attached thereto to be rotatably driven, and a lens 37 positioned on the optical axis X. In the binocular apparatus 30, a first mirror 38 is mounted at the center of the housing 11 between the cameras 14 and 34. The mirror 38 is a two-sided mirror, and is mounted at a 45° angle to the X axis. The one side 38A of the mirror 38 serves the original combination as described in FIG. 1, while the other side 38B serves the additional combination, being positioned at a 45° angle with respect to the image plane of the second camera 34. The angled end 33 of the linear extension 31 further includes a second aperture 39 formed therein for receiving the upper end 40 of a second L-shaped housing 41 which is also oriented about the Z axis. The L-shaped housing 40 is in optical communication with the second camera 34 by reflection from the mirror 38B. A third mirror 42 is mounted in the L-shaped housing 41 at the corner thereof at a fixed angle (preferably 45°) with the perpendicular for redirecting the optical path out through the other open end 44. The optical path extending out of the open end 44 of the second L-shaped housing 41 is in a parallel relationship to the optical path extending out of the open end 23 of the L-shaped housing 21. Finally, the upper end 40 of the L-shaped housing 41 also includes an annular gear 45 fixedly attached thereto for engagement with a driving gear which is described with reference to FIG. 3.

FIG. 3 shows the drive means, generally indicated by arrow 50, for rotatably driving the cameras 14 and 34 and the L-shaped housing 21 and 41. The drive means includes a motor 51 having a drive gear 52 extending out of the one end thereof. The drive gear 52 is drivingly engaged to a gear 53 which is integrally connected to a shaft 54. Each end of the shaft 54 includes a pinion gear 55 for drivingly engaging the gears 24 and 45, respectively. The shaft 54 also includes a bevel gear 56 which is drivingly engaged to a pair of bevel gears 57, which in turn, is integrally connected, through a pair of shafts 58, to a pair of pinion gears 59 which drivingly engage the gears 16 and 36 of the cameras 14 and 34. The support structure of the drive means 50 are not described herein for reasons of brevity, because such details form no part of the present invention and because such details will immediately suggest themselves to those skilled in this art.

FIG. 4 shows another embodiment of the scanning apparatus in which a pair of cameras can utilize the same mirror in forming optical paths through a single L-shaped housing. The apparatus, generally indicated by arrow 60, includes a linear housing 61 having a pair of cameras 62 and 63 rotatably mounted therein with the optical end of each camera facing a mirror assembly 64. The mirror assembly 64 includes an apertured mirror 65 fixedly mounted in the housing 61 with one face 66 positioned at a 45° angle to the image plane of the camera 62. A mirror 67 is inserted perpendicular to the mirror 65 and is also mounted within the aperture of the mirror 65 perpendicular thereto and includes a face 68 positioned at at a 45° angle to the image plane of the camera 63. The lines formed by the intersecting planes of mirrors 65 and 68 is perpendicular to the rotational axis of L-shaped housing 73. Camera 62 is constructed as a large aperture, long focal length, narrow field of view instrument requiring a large surface 66 provided by the mirror 65, while camera 63 is constructed as a small aperture, short focal length, wide field of view instrument capable of utilizing the small surface 68 of the mirror 67. An objective lens 69 is utilized in camera 62 for collecting and focusing the light rays traversing therethrough onto the mirror 65 while the lens located on the camera 63 focuses the light rays traversing therethrough onto the mirror 67.

The linear housing 61 further includes an apertured projection 70 having an opening 71 for receiving the upper end 72 of an L-shaped housing 73. As in the previous embodiments, the L-shaped housing 73 is oriented perpendicular to the axis of the housing 61 and in optical communication with the cameras 62 and 63 by reflection from the mirrors 65 and 67 through the upper end 72. The L-shaped housing 73 is adapted to rotate about the optical axis, and includes a mirror 74 fixedly mounted therein at a fixed angle with the perpendicular for redirecting the optical path through the open end 75.

Figure 5:
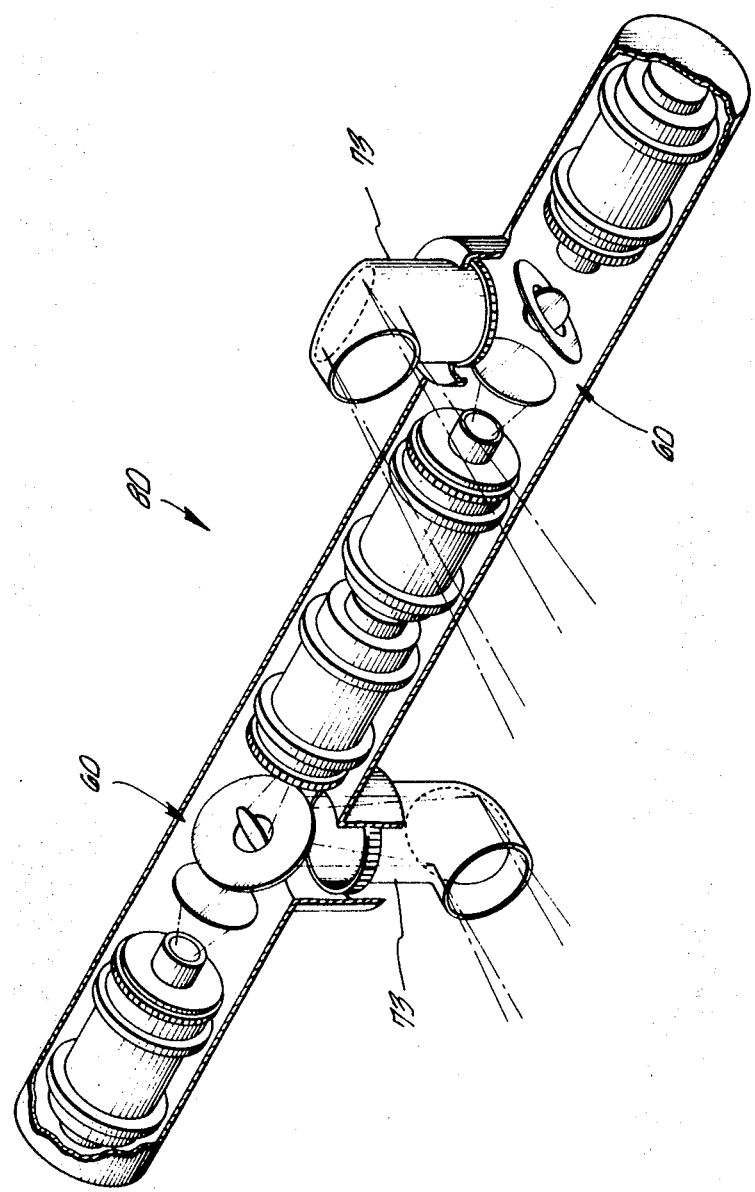
FIG. 5 is a perspective view of still another embodiment of the present invention.

FIG. 5 shows a scanning apparatus, generally indicated by 80, comprising two of the dual camera apparatus 60 with L-shaped housings 73 oriented in a binocular orientation.

OPERATION

In the embodiment shown in FIG. 1 the image received at the open end 23 of the L-shaped housing 21 is focused on the reflecting surface of the mirror 22 which, in turn, reflects the image to the reflecting surface of the mirror 18 which is in operative alignment with the focal point of the lens 17 of the camera 14. As a result of the driving means 50 (FIG. 3), the L-shaped housing 21 can be rotated about the Z axis relative to the linear housing 11 or the whole apparatus 10 can be rotated in unison about the X axis. Upon rotation of the L-shaped housing 21, the optical axis rotates about the Z axis while the entire apparatus is permitted to rotate anywhere in the Y-Z plane. As is well known, if the L-shaped housing 21 is rotated, the image received by the mirror 16 also rotates at a similar rotational speed. However, in accordance with the present invention, the camera 14 is also geared to rotate in the opposite direction to compensate for image rotation so that on the television monitor, the picture is always upright. As a result, the image received by the L-shaped housing 21, both in azimuth and in elevation, is accurately transmitted to the camera 14 and the counter rotation of the camera 14 compensates for the image rotation on mirror 18.

The operation of each of the combinations of the embodiment shown in FIG. 2 operates exactly as the embodiment shown in FIG. 1, with the images received by the L-shaped housings 21 and 41 having a binocular effect. The entire assembly 30 may be rotated in unison about the X axis, or the L-shaped housings 21 and 41 may be rotated in unison with respect to the housing 11 about the Z axis. In this embodiment the optical axis extending out of the L-shaped housings 21 and 41 always point in the same direction with the cameras 14 and 34 rotating as required to compensate for the image rotation. Due to the physical distance between the optical axes of the L-shaped housings 21 and 41, the images produced by the cameras 14 and 34 may be used as binocular information for viewing or other measurement applications.

In the embodiment shown in FIG. 4 the long focal length camera 62 and the short focal length camera 63 are combined in the compact system with no parallax errors whatsoever. In such an apparatus the wide angle system can be used to spot and index, in a wide field of view, objects to be examined by the high-power, narrow field angle system. In FIG. 5 with the system comprised of two dual camera apparatus 60, binocular information of both wide and narrow field angles can simultaneously be obtained without any parallax errors between narrow field angle and wide field angle image errors.

An alternate mode of operation can be carried out in accordance with the present invention wherein one aperture of the binocular system may be used for direct illumination while the other aperture is used for viewing. In such a mode, the internal structure of the apparatus inherently affords excellent isolation of the optical sensors from the illumination, while maintaining all of the advantages of a locked optical gimballing apparatus. This is particularly advantageous in laser communication applications where illuminators such as pulse crystal lasers are used in conjunction with sensitive image sensors. In such devices maximum isolation is essential. Additionally, the binocular aperture separation afford maximum geometric isolation from near field particle or Raleigh scattering phenomenon, while maintaining optical gimballing alignments with a minimum weight mechanism.

Another important advantage of the present invention is that the camera or other sensors are mounted in the housing so as to rotate about their axes of least inertia. This is the only movement that is required of each camera and lens assembly in contrast to gimballing the camera in two axes, as in the prior art, for pointing in any direction. Because the camera is counter rotated in relation to the aperture direction, with the X axis in the vertical position, the image formed on the camera remains oriented with respect to the horizon regardless of the pointing direction. The spacing of the aperture is constrained to approximately the same axis and the same pointing direction such that stereo images may be obtained when two cameras are used in the basic binocular configuration of the inovation. As a result, the scanning apparatus is provided wherein the complex derotating elements are eliminated along with the gimballing structures supporting the mirrors.

What is claimed is:

1. An optical binocular scanning apparatus comprising:
   an elongated linear housing;
   a first optical instrument located within said housing, said first optical instrument having an optical end with a portion of said housing forming an optical path leading from said optical end;
   first reflecting means mounted within said housing at the optical end of said first optical instrument for redirecting the optical path within said housing;
   a first tubular body having one end rotatably mounted on said linear housing with the one end being in optical communication with said first reflecting means, said tubular body forming an optical path leading from said first reflecting means;
   second reflecting means mounted within said tubular body member for redirecting the optical path out through the other end of said tubular body;
   a second optical instrument located within said linear housing, said second optical instrument having an optical end facing the optical end of said first optical instrument with said first reflecting means interposed therebetween;
   third reflecting means on said first reflecting means for redirecting the optical path leading from the optical end of said second optical instrument;
   a second tubular body having one end rotatably mounted on said housing with the one end being in optical communication with said third reflecting means on said first reflecting means;
   fourth reflecting means mounted within said second tubular body for redirecting the optical path out through the other end of said second tubular body; and
   said optical instruments being simultaneously rotatably mounted within said housing to compensate for the image rotations on said first and said third reflecting means as said tubular bodies are simultaneously rotated.

2. The invention in accordance with claim 1 wherein said optical instruments are image sensors.

3. The invention in accordance with claim 1 wherein said optical instruments are optical projectors.

4. The invention in accordance with claim 2 wherein each image sensor is a camera.

5. The invention in accordance with claim 2 wherein each image sensor is a vidicon.

6. The invention in accordance with claim 1 wherein said first reflecting means comprises a first mirror mounted at a 45° angle to the image plane of said first optical instrument.

7. The invention in accordance with claim 1 wherein said second reflecting means is a mirror mounted at a 45° angle with respect to the axis of said first tubular member.

8. The invention in accordance with claim 1 further including drive means for rotatably driving said tubular bodies in either rotational direction and for counter rotatably driving said optical instruments with respect to the rotational direction of said tubular bodies.

9. The invention in accordance with claim 1 wherein the optical path extending out of said second tubular body lies in a plane parallel to the plane formed by the optical path of said first tubular body.

10. The invention in accordance with claim 1 wherein said third reflecting means on said first reflecting means comprises a second mirror being in optical communication with said second optical instrument.

11. An optical binocular scanning apparatus comprising:
    an elongated linear housing;
    a first optical instrument located within said housing, said first optical instrument having an optical end with a portion of said housing forming an optical path leading from said optical end;
    first reflecting means mounted within said housing at the optical end of said first optical instrument for redirecting the optical path within said housing;
    a first tubular body having one end rotatably mounted on said linear housing with the one end being optical communication with said first reflecting means, said tubular body forming an optical path leading from said first reflecting means;
    second reflecting means mounted within said tubular body member for redirecting the optical path out through the other end of said tubular body;
    a second optical instrument located within said linear housing, said second optical instrument having an optical end facing the optical end of said first optical instrument with said first reflecting means interposed therebetween;
    third reflecting means on said first reflecting means for redirecting the optical path leading from the optical end of said second optical instrument through said first tubular member; and
    said optical instruments being simultaneously rotatably mounted within said housing to compensate for the image rotations on said first and third reflecting means as said tubular bodies are simultaneously rotated.

12. The invention in accordance with claim 11 wherein said first reflecting means comprises a first mirror mounted at a 45° angle to the image plane of said first optical instrument and said third reflecting means comprises a second mirror mounted normal to said first mirror and at a 45° angle to the image plane of said optical instrument.

13. The invention in accordance with claim 12 further including drive means for rotatably driving said tubular body in either rotational direction and for counter rotatably driving said optical instruments with respect to the rotation of said tubular body whereby the counter rotation of said optical instruments compensates for the image rotation on said first reflecting means as said tubular body is rotated.